United States Patent [19]

Steiner

[11] Patent Number: 4,939,652

[45] Date of Patent: Jul. 3, 1990

[54] TRIP RECORDER

[75] Inventor: Jack Steiner, Quebec, Canada

[73] Assignee: Centrodyne Inc., Montreal, Canada

[21] Appl. No.: 167,871

[22] Filed: Mar. 14, 1988

[51] Int. Cl.[5] .............................................. G06F 13/00

[52] U.S. Cl. .......................... 364/424.04; 364/424.03; 340/438

[58] Field of Search ...................... 364/424.01, 424.03, 364/424.04, 431.01, 442; 73/489, 490, 491, 117.3; 340/438, 439

[56] References Cited

U.S. PATENT DOCUMENTS

| | | | |
|---|---|---|---|
| 4,188,618 | 2/1980 | Weisbart | 364/424.64 |
| 4,258,421 | 3/1981 | Juhasz et al. | 364/442 |
| 4,395,624 | 7/1983 | Wartski | 364/424.04 |
| 4,646,241 | 2/1987 | Ratchford et al. | 364/424.06 |
| 4,692,882 | 9/1987 | Skovgaard et al. | 364/424.01 |
| 4,757,454 | 7/1988 | Hisatake et al. | 364/424.01 |

*Primary Examiner*—Gary Chin

*Attorney, Agent, or Firm*—Chilton, Alix & Van Kirk

[57] ABSTRACT

A system for monitoring, recording and displaying vehicle operating parameters is described, which is capable of simultaneously providing operating data for the driver, an on board summary of critical trip parameters, and storage of monitored vehicle operating data for subsequently generating reports off-line which describe in detail the selected trip information. The system consists of a Vehicle Mounted Unit [VMU] which accepts inputs from a variety of sensors. Using these inputs, the VMU continuously computes the various parameters in order to provide the operating data as well as the on board trip summary. Detailed data are simultaneously stored in the VMU memory for subsequent processing by an off-line computer. The contents of the VMU memory may be transferred to the computer in a variety of ways. A direct connection can be made between the VMU in the vehicle and the computer; the VMU can be removed from the vehicle and subsequently connected to the computer; or an intermediate device, such as the optional Data Transport Unit [DTU] described, may be used to transfer VMU data to the computer.

8 Claims, 10 Drawing Sheets

TRIP RECORDER

BACKGROUND OF THE INVENTION

1. Field of the Invention

This invention relates to the field of vehicle monitoring systems. In particular it deals with the method of compressing data for on board storage and subsequent transfer of these data to a computer for analysis.

2. Description of the Prior Art

Prior art vehicle monitoring systems have either provided display means only, with no provision for storage means, or they have used on-board paper or magnetic tape as the storage media, as disclosed in U.S. Pat. Nos. 3,099,817; 3,964,302; 4,050,295; 3,864,731; 3,938,092; 3,702,989 and 3,792,445. Such electromechanical storage means suffer the disadvantages of being unreliable and bulky. Purely electronic solid-state memory has been used, but one of the difficulties of using solid-state memory to provide storage for continuous real-time data, such as has been disclosed in U.S. Pat. No. 4,188,618, is that this approach requires large amounts of memory to achieve the required resolution over a recording period of several weeks. Some systems that have used solid-state memeory have not recorded continuous real-time data. Instead, they compared the raw data to pre-set limits, and recorded only those data which fell outside the limits. A system representative of this approach is the subject of U.S. Pat. No. 4,258,421.

The limitations to this approach are that the raw data are not available for subsequent analysis. One is thus unable to scrutinize the data for events that were within the previously defined limits, since these were not recorded.

Another problem has been the question of how to transfer the on-board data to the off-line computer. There have been several approaches to this problem. Either an intermediate unit was used to transfer the data to the computer, as disclosed in U.S. Pat. No. 4,258,421, or the memory portion of the on-board unit was made removable, in which case some additional unit was still required to read the data and interface to the computer. This latter example has been disclosed in U.S. Pat. No. 4,188,618, which also describes other methods of transferring the data to the computer, each of which requires a separate embodiment.

It is a desirable feature of vehicle recording systems to allow the driver or operator to enter data which are subsequently available as part of the computer report. It is also desirable that these data be presented in a man-readable form (such as English language). The solution to this problem has generally been to provide a separate input device, as disclosed in U.S. Pat. No. 4,258,421. This device may be an alphanumeric keyboard or some other device which presents codes to the recording system.

In the latter case the codes can then be included in the report directly, or they can be translated into man-readable form by the computer. The problem with this approach is that, due to the large amount of information that generally needs to be entered, the driver would need a very lengthy list of all the codes and their meanings.

SUMMARY OF THE INVENTION

It is an object of this invention to develop a data compression scheme that can provide "real-time" data as opposed to data outside pre-set limits, while at the same time requiring significantly less memory than would be needed to record individual samples in a continuous stream. This compression scheme retains the benefits of having all the data available for subsequent analysis while greatly reducing the memory requirements.

It is a further object of this invention to develop a data collection scheme that lends itself to high resolution recording for relatively short periods of time while minimizing the amount of memory required. This scheme is particularly useful in case of accidents but may also be used for any short duration event recording.

It is a further object of this invention to design the vehicle unit in such a manner that data transfer to the computer can be carried out in either of several ways.

(1) by removing the unit from the vehicle and directly connecting said unit to the computer without any intermediate device.

(2) by directly connecting the unit in the vehicle to the computer without any intermediate device other than the connecting cable.

(3) by using a portable data transfer unit to read the VMU (Vehicle Mounted Unit) while in the vehicle.

(4) by connecting said VMU via commerical modem and telephone link to the computer.

In accordance with the invention, a system may include one or more of the above data transfer methods. Thus, a system may include only transfer data method No. 1 or transfer data method No. 4. In addition, it is possible to have a single embodiment which includes all of the above data transfer methods.

A further object of the invention is to provide a data entry scheme whereby the driver can enter data into the unit using only the available switches and displays which are an integral part of the VMU, and not requiring a separate input device. This objective is realized in a manner which requires that the driver needs only a limited number of codes, and the resulting data are available in the computer report in man-readable form.

A circuit is also described which provides an orderly shut-down of the on-board unit in the event of either power interruption or complete removal of the unit from the vehicle.

These objects will be more clearly understood with reference to the accompanying detailed description, the appended claims and the drawings, in which:

DETAILED DESCRIPTION OF THE INVENTION

Figure 1:
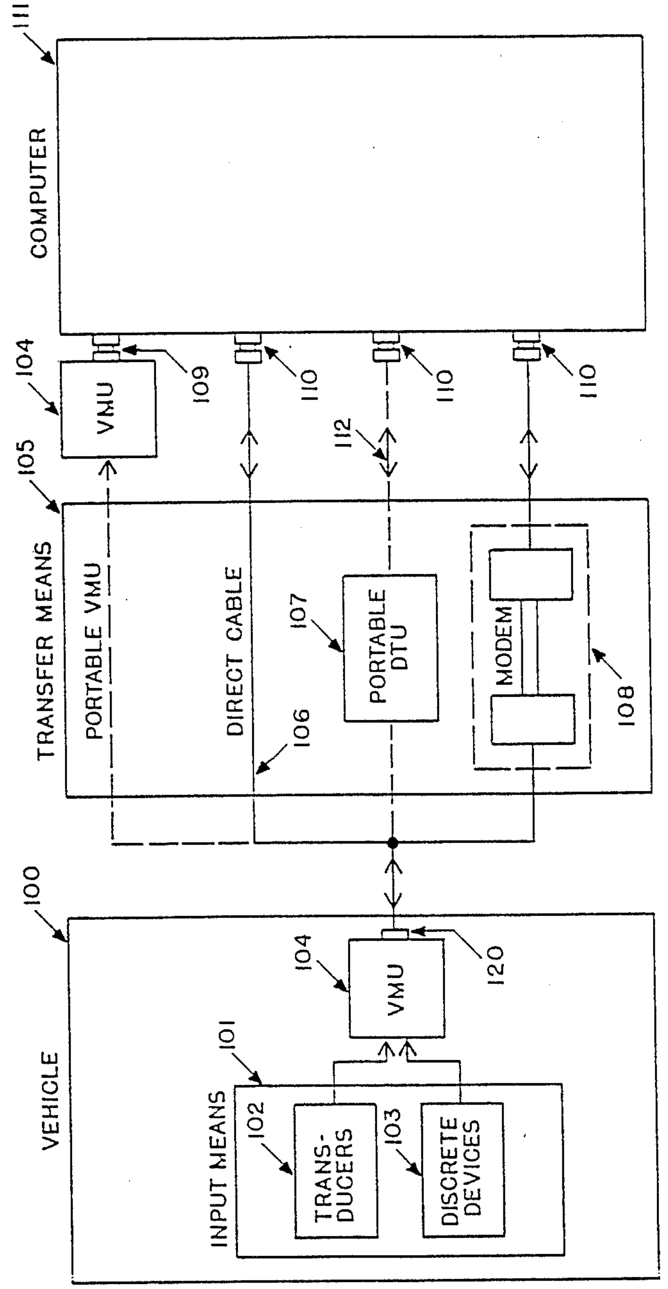
FIG. 1 is an overall block diagram of the vehicle monitoring and recording system.

FIG. 1 is an overall blcok diagram of the system. It consists of a vehicle mounted unit 104 which receives inputs from various input means 101. The input means are transducers 102 which provide the VMU with electrical signals corresponding to the measured parameters. The VMU may also accept inputs from discrete devices item 103 which monitor the state of various vehicle components. The VMU processes the input data for immediate or subsequent display and records data in its internal memory for computer 111 report generation. At the end of a trip, or whenever the customer so desires, data are transferred from the VMU to the computer 111 using transfer means 105. Several alternatives of transferring the data as described in SUMMARY OF THE INVENTION are shown in FIG. 1 as items 109, 106, 107 and 108. These are all available in a single embodiment.

Although FIG. 1 illustrates the availability of all four data transfer methods in a single embodiment, as above described, it is within the scope of the invention to include only a single data transfer method in a system, or to include two or three of the data transfer methods in any inventive system.

Figure 2:
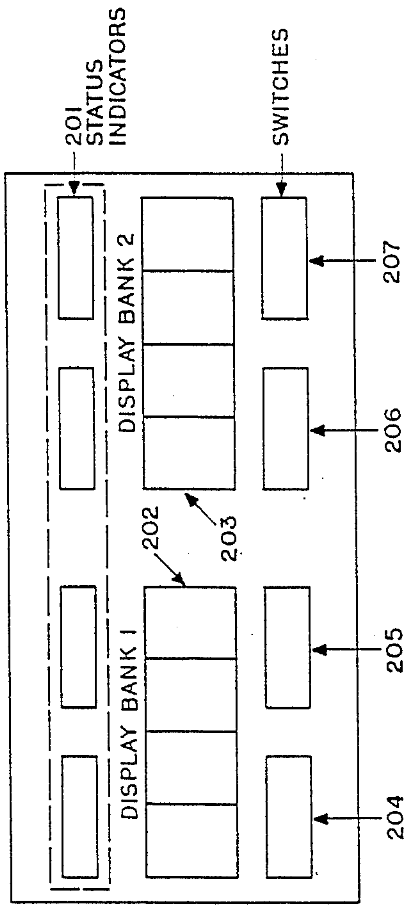
FIG. 2 shows a front view sketch of an embodiment of the vehicle mounted unit.

FIG. 2 is a front view sketch of the preferred embodiment of the VMU. The Status Indicators 201 and Display Banks items 202 and 203, are used to provide continuous driver information as well as statistical data for owners or managers.

The switches, items 204, 205, 206 and 207, are used to control the operation of the VMU and to select the data to be displayed. The above displayed outputs may be inhibited under program control and, in any event, do not form an essential feature of this invention.

A method is described which allows these same switches, in combination with the display means, to provide a driver data entry scheme that avoids the necessity of an external input device. Since there are only four switches, it is necessary to provide codes to represent the input data. The four switches, items 204, 205, 206 and 207, in combination with the Display Banks items 202 and 203, can represent numeric codes 0000 through 9999, which gives a total of 10,000 individual numeric codes. Each of these numeric codes can then be assigned an input data item. For example, the numeric code 0101 might be chosen to represent "Border crossing Quebec to New York".

The large number of codes in such a simple scheme would be very inconvenient to the user, since he would be forced to memorize numerous different codes for all of the input data that he needs. The data entry scheme in this invention reduces the number of input codes that would otherwise be required in the simple scheme described above, and still provides the entered data in man-readable form in the computer report.

This is accomplished by separating the data into two parts: a data category; and the data itself. A single numeric code is entered corresponding to the data category. Switch 206 is used to slew the displays to the required number. This is followed by entering the actual data in a similar fashion using switches 204 and 205. As an example, if a driver wishes to indicate a State line crossing he would enter one code corresponding to the category, border crossings, and a subsequent code indicating the actual State line. As a further example, if the driver needed to indicate the weight of the load he was carrying, he would enter one code for load weight and then enter the actual weight. At the time of report generation, the computer would use the category entry as a key to retrieve the text for both the category and the data. The entered data are time-stamped for detailed reporting.

Although a numeric code has been discussed above, it will be apparent to one skilled in the art that it would be equally appropriate to use an alphanumeric code consisting of alphanumeric characters.

Figure 3:
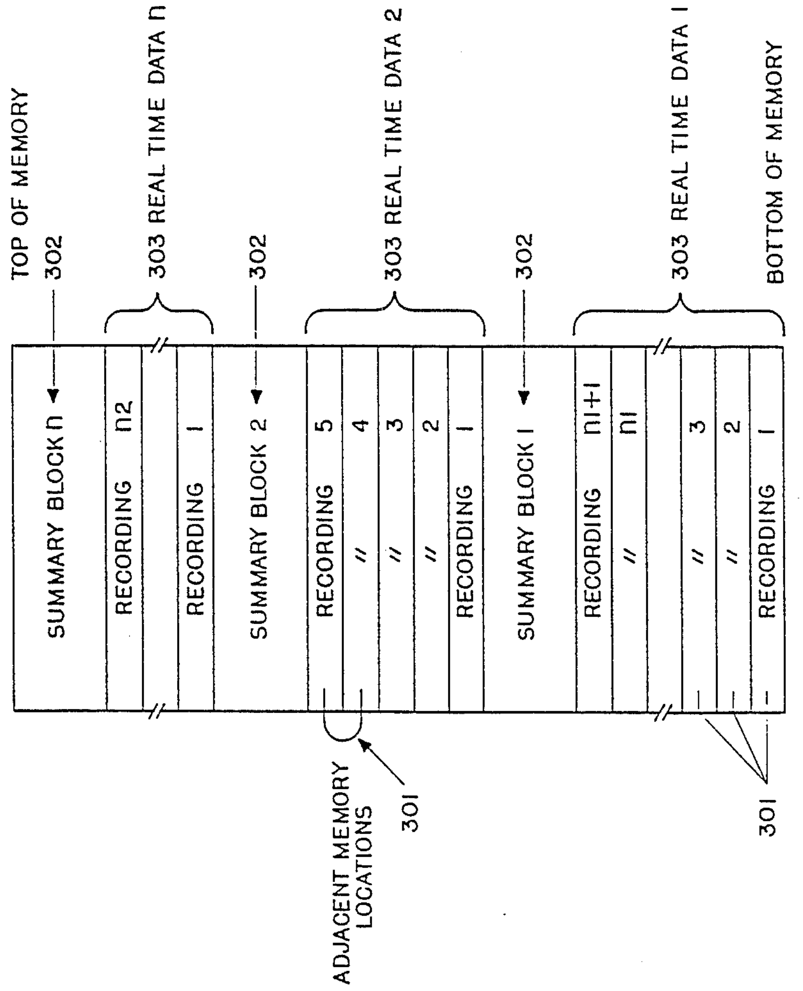
FIG. 3 shows a memory map of the compression scheme in the preferred embodiment of the invention.

FIG. 3 is a memory map of the compression scheme referred to in the SUMMARY OF THE INVENTION. This compression scheme allows the recording of "real-time" data while significantly reducing the amount of memory required for data storage, and as a result is more readily adaptable for use with solid state memories. A single parameter is chosen, and at fixed time intervals, data representative of the total activity during that time interval are recorded in contiguous memory locations 301. The compression is achieved primarily by the fact that each record is a summary of the activity of the function during the time interval, as opposed to being an instantaneous sample. In the case of vehicle speed for example, one could record average speed during the time interval. Or, in the case of distance travelled, one could record the total distance travelled in each time interval.

At each time interval therefore, a summary of the particular activity chosen is recorded in contiguous memory locations 301. Thus, if the time interval is chosen to be one second, there would be 3600 records in each hour of use. Whereas, if the time interval is chosen to be one minute, there would only be 60 records in each hour of use. It is evident that the latter choice of interval use 60 times less memory than the former. However, the former choice of time interval being much shorter than the latter choice of time interval, results in a more accurate representation of the instantaneous value of the activity, and therefore has better resolution. The value of the time interval is thus a tradeoff between available memory and resolution. The "real-time" data 303, are shown in FIG. 3 as the adjacent memory locations of the contiguous memory sections. To achieve further compression, data are not recorded during the interval that the function has zero value. Instead, a summary block, item 302, is inserted in memory, which indicates the length of time the function was zero. A summary block may also contain data corresponding to the total activity, since the last summary block, for functions with less stringent resolution requirements.

Although the illustrated embodiment contemplates a summary block between two memory locations containing data, it will be apparent to one skilled in the art that the periods of inactivity can be summarized in other predetermined memory locations which are not contiguous with the remainder of the memory locations.

Figure 4:
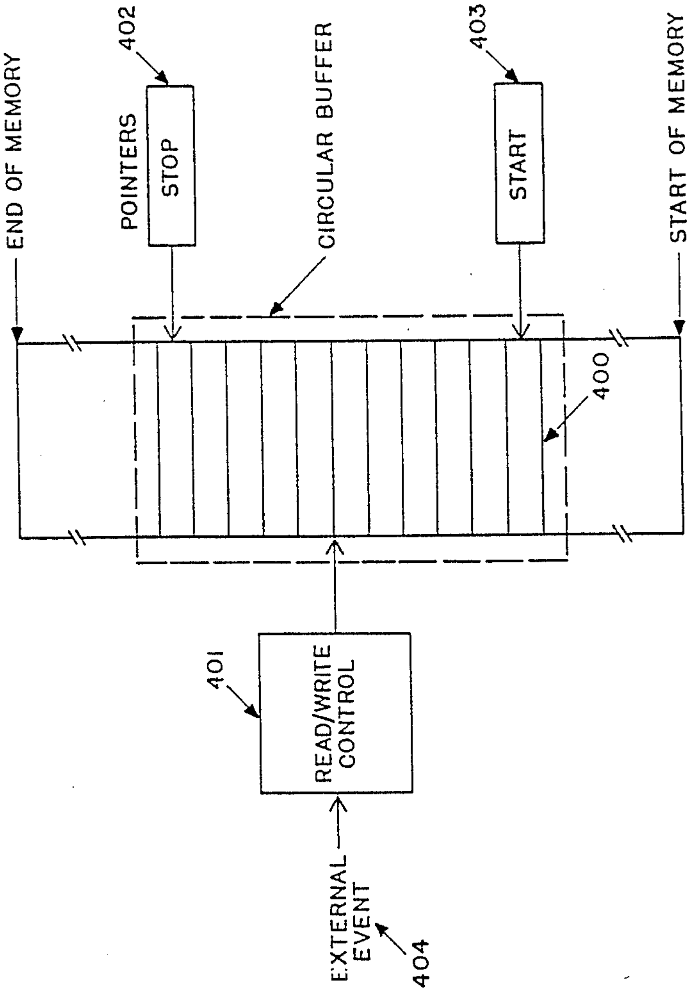
FIG. 4 shows in schematic form the circular memory buffer used in the high resolution data collection scheme.

FIG. 4 is a summary of a data collection scheme which lends itself to high resolution data monitoring for short periods of time. This provides a 'magnified' view of the activity of one of the functions prior to and following a specified event.

The data compression scheme described above is used to continuously record data in a circular buffer. The time interval however, is chosen to be far shorter than that used in the compression scheme described above, to provide greater resolution. This is acceptable since the event of interest is of short duration, resulting in a relatively short record. The circular buffer 400 is used such that data are recorded in the buffer until it is full, as defined by memory address pointer 402, at which time recording continues at the beginning of the buffer, as defined by memory address pointer 403, overwriting previous data. This provides a record of the latest activity of the vehicle. As in the main compression scheme, data are not recorded during a period of "no activity". Instead, an indication of the duration of this period is inserted into storage to improve compression.

Again, the summary blocks of the inactivity periods need not be in line with the remainder of the summary blocks but can be disposed at other predetermined memory locations.

A method is provided whereby the data collected for some time prior to an external event 404 and for some time following that event, are retained. This is achieved by inhibiting further writing to the circular buffer 400. Any of various types of discrete input devices, such as a manual or impact switch, may be used to initiate data retention via the read/write control 401.

Data retention may be accomplished by copying the contents of the circular buffer 400, to some other location in memory, or by allocating a different memory area for subsequent use as a circular buffer. Memory address pointers 402 and 403 are provided to determine the record start and stop locations within the buffer.

A method is provided for suspending the normal operation of the device in the event of a power failure, and for recording the time and duration of said failure. The feature of recording the time and duration of the failure is particularly useful to detect unauthorized removal of the unit, particularly since the unit is designed to be portable for data transfer to the computer. The method comprises:

(1) electronic circuitry to detect and respond to power failure.

(2) means of recording the time, data and duration of the power failure.

Figure 5:
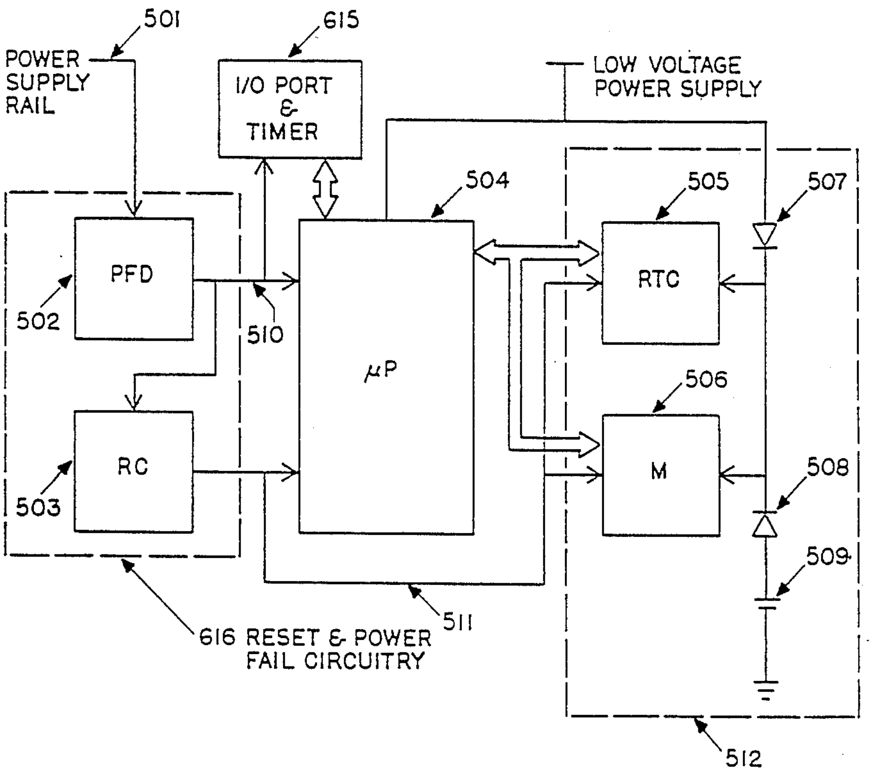
FIG. 5 is a block diagram of the power fail detection scheme in the preferred embodiment.

FIG. 5 is a block diagram of the power fail circuitry. A drop in the supply voltage along line 501 is detected by the power fail detect circuitry item 502 and causes an interrupt to be issued to the microprocessor 504 along line 510. The microprocessor 504 then initiates execution of a power fail routine which saves, in non-volatile memory 506, data currently being processed, as well as the current time and date. The signal on line 510 is also fed to the reset circuitry item 503, which after allowing sufficient time for the microprocessor 504 to complete it's shut down routine, halts the microprocessor 504. When power is restored, the time and date are recorded in memory 506, thereby enabling the duration of the power failure to be determined.

DETAILED DESCRIPTION OF THE PREFERRED EMBODIMENT

The following description is given only as an example of a possible embodiment of the invention and is in no way intended to define or limit the scope of the invention.

Figure 6:
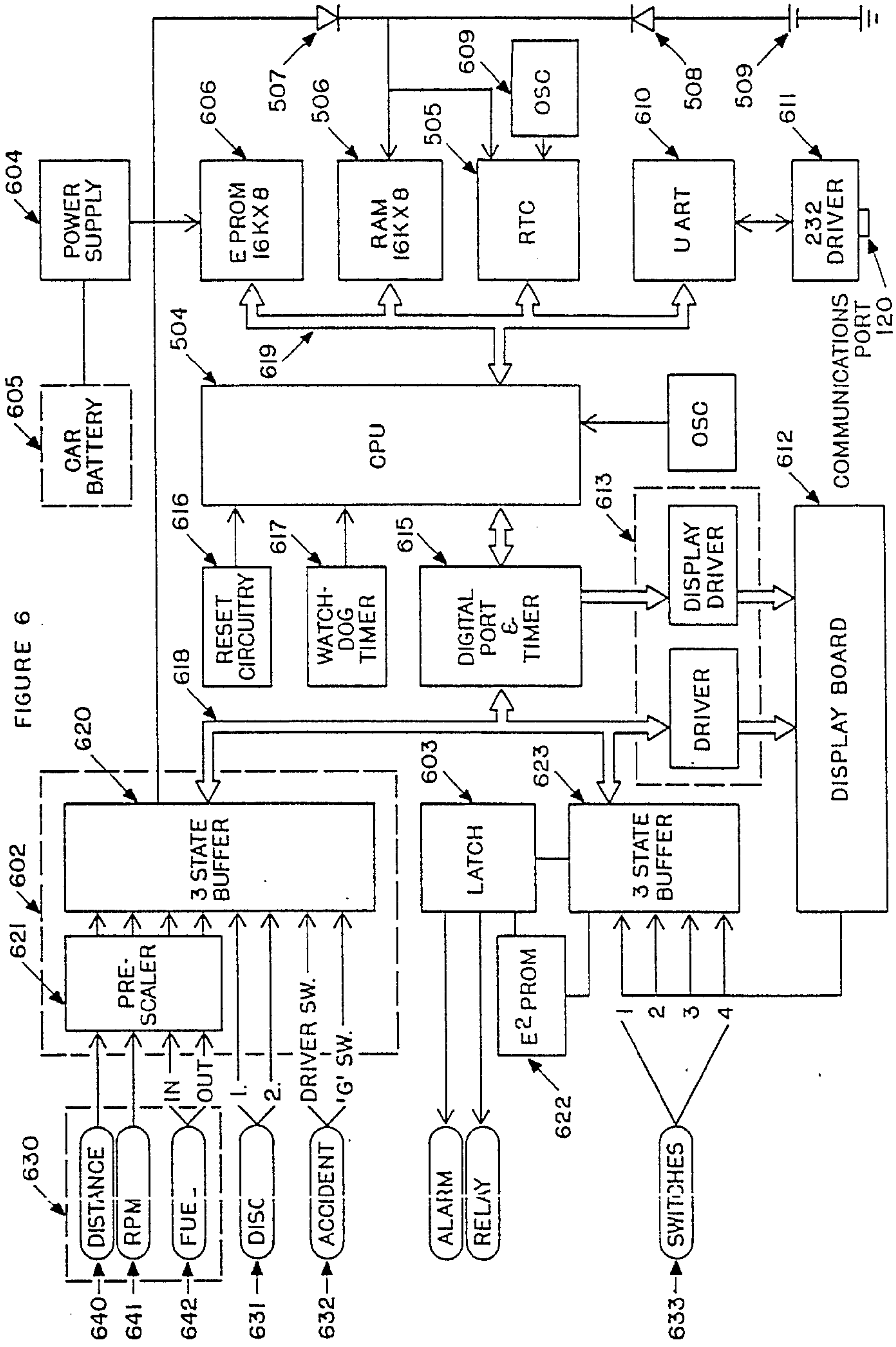
FIG. 6 is a block diagram of the vehicle mounted unit embodying the principles of the invention.

FIG. 6 is a block diagram of the hardware in the preferred embodiment of the VMU. The main components of the VMU hardware are a microprocessor 504 and associated Input/Output (I/O) and integral timer unit 615, program memory 606, data memory 506, memory for program control parameters (program data memory) 622, display interface 613, user data entry interface 623, sensor interface 602, serial communications interface 610, 611 and real-time clock circuitry 505, 609. Also shown are the reset and powerfail detect circuitry 616, the power supply 604 and the internal miniature backup battery 509.

The microprocessor 504 and I/O and timer 615 units may comprise any of a number of currently available units, for example the National Semiconductor NSC800 and NSC810, respectively. The program memory 606, comprises an erasable programable read only memory (EPROM) such as National Semiconductor 27C256. The data memory 506, comprises random access memory (RAM) devices, such as NEC 4464. Program data memory 622, comprises an electrically erasable programable read only memory (EEPROM) such as NCR 59308. The display interface 613, comprises a digit selector, such as NSC 74HC4017, an output driver, such as Motorolla ULN2003, and a binary-coded-decimal (BCD) to seven-segment display driver, such as NSC 74HC48. The user data entry interface 623, comprises an input buffer such as NSC 74HC244. The sensor interface 602, comprises an input buffer, such as NSC 74HC244, and a prescaler. The serial communications interface 610, 611, comprises a universal asynchronous receiver transmitter (UART), such as National Semiconductor 858, and an RS232 driver such as Motorola MC1488. The real-time clock circuitry 505 comprises a real-time clock chip, such as NSC 58167A, and a crystal oscillator 609.

There are provided address and data lines 619 and I/O lines 618 to interconnect the various components of the VMU. Also shown are the sensor inputs 630, discrete device inputs 631, user data entry switch inputs 633 and event switch inputs 632. The discrete device inputs 631 may be used to sense the occurrences of brake applications, headlight on/off and the like, while the data entry switch inputs 633 are provided for entering driver operational codes, such as border crossings, amount of load being carried and the like. Event switch inputs 632 are used to trigger the high resolution scheme described below, automatically or manually when an accident occurs.

Power is supplied to the unit from the vehicle's battery 605, through the power supply 604 when the unit is mounted in the vehicle, and when it is removed from the vehicle the backup battery 509 provides sufficient power to maintain the data stored in random access memory 506 and the real-time clock chip 505, for a period of approximately six months.

The display interface 613 provides a link between the microprocessor 504, and the front panel display 612. The user data entry interface 623 provides an interface to the push-button switches 633 used by the operator for entering data and selecting operating modes of the display 612.

The microprocessor 504 serves to execute a control program stored in program memory 606, which controls the operation of the VMU. The microprocessor 504, operating in accordance with said control program executes the following functions:

(1) Causes receiving, processing and storing, in data memory 506, of data received from the sensor inputs 630, and various switch inputs 631, 632, 633.

(2) Emits signals to drive the display 612.

(3) Controls the receiving and transmitting of serial data between the serial communications interface 610, 611 and communications port 120.

(4) Responds to an interrupt from the power fail detect circuit 616, and provides an orderly shut-down of the microprocessor 504, in the event of a power failure.

Means are provided to allow customizing of the operation of the VMU control program. This is accomplished by storing parameters, used by the program, in program data memory 622. These parameters can be set up and changed, at any time, by an off-line computer, example item 111 of FIG. 1, or the optional Data Transport Unit [DTU], item 107 of FIG. 1.

Compression of "real-time" data in the preferred embodiment is accomplished in the following manner. Refer to FIG. 3 also.

Sensor inputs 630, are polled by microprocessor 504, at a rate high enought to detect any data from the sensors. The data received from the sensors in this manner are in the form of electronic pulses. The count of pulses received from each sensor is retained in registers located in an area of data memory 506, reserved for this purpose. Distance is chosen as the primary function in this embodiment. At successive fixed time intervals, the count of pulses received from the distance sensor 640, during each fixed time interval, is stored in memory buffer within data memory 506, at contiguous locations, and the register used to accumulate the count is reset to zero.

Whenever there is zero data received from the distance sensor for a specified time period, a summary block is stored in the memory buffer, instead of recording zero distance, for the duration of time for which zero data is received from the distance sensor. When pulses are again received from the distance sensor, the process of storing distance data resumes at the memory location following the summary block entry.

In the preferred embodiment, a summary block contains the following data: a count of the number of fixed time intervals during which the received data was zero; values representative of the total number of engine revolutions since the previous summary block entry; maximum RPM since the previous summary block entry; total fuel consumed since the previous summary block entry; and a date and time entry indicating the time at which recording of distance data resumed.

The fuel data and engine RPM data which have been stored in the respective registers of data memory 506, as explained in the previous paragraphs, are transferred to the summary block 302. The respective registers of data memory 506 are then reset to zero, permitting data to be accumulated once again, for inclusion in the next summary block 302 entry.

In the preferred embodiment, the memory available for the storage of the compressed "real-time" data is approximately 13,000 bytes. The distance data values are stored in successive bytes of this available memory, for each fixed time interval. The fixed time interval is user selectable to be either 15 or 60 seconds, depending on the desired data resolution. The data capacity of the VMU depends on the specific use of the vehicle, but is typically in the range of two weeks to twenty days.

The high resolution data collection scheme, in the preferred embodiment, is implemented by using a 60 byte area in data memory 506, as a circular buffer, to record, at one second intervals, the average speed at which the vehicle was moving during the one second interval. The average speed at each interval is stored at consecutive byte locations in the 60 byte buffer. Reference to FIG. 4, will promote a better understanding of the scheme.

Whenever the average speed is zero for a period of three seconds or more, a summary block is stored in the memory buffer, instead of recording zero distance, for the duration of time for which zero data is received from the distance sensor. The summary block contains values which indicate the length of time for which the average speed was zero.

Locations in the buffer are accessed in a circular manner, as described in the DETAILED DESCRIPTION OF THE INVENTION, so that, at any one instant, the buffer contains the average speed at each second during the preceding 60 seconds. Two switches 632, are provided to initiate transferring of the contents of the buffer to an area of data memory where it will be retained for subsequent analysis. One switch is an impact triggered switch that will activate if the vehicle is involved in an accident, and the other switch is a push button switch that may be manually activated by the driver of the vehicle. A separate area in data memory 506, is allocated for retaining the contents of the circular buffer, for each switch.

The impact triggered switch may comprise a self-triggering device such as an accelerometer switch, or a level detector switch. Either the self-triggering device or the manual switch can be activated for any of a set of predetermined conditions, for example, emergency conditions or simply the desire of the driver to retain the information.

Activation of either switch causes the data from the circular buffer to be stored in the appropriate area of memory, after a delay of 15 seconds. The retained data therefore represents vehicle activity for a time period starting 45 seconds prior to activation of either switch, and ending 15 seconds after such activation. Along with the buffer contents, the time of switch activation and the memory address pointers are also stored, to permit association of the data with a specific time during analysis.

Figure 7:
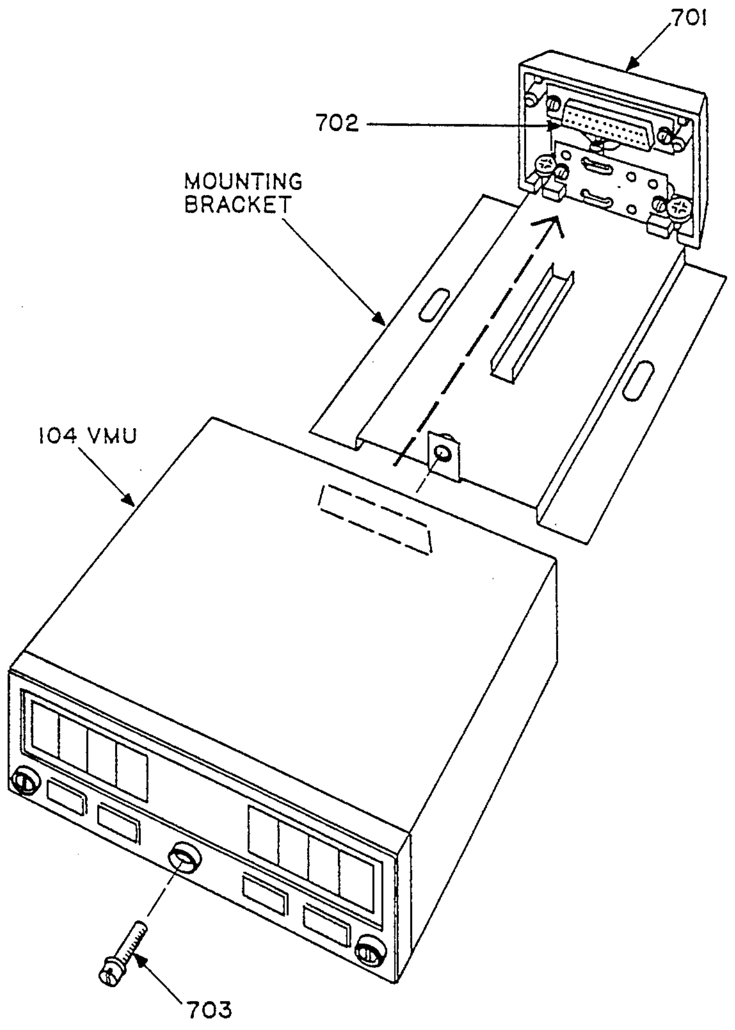
FIG. 7 is a pictorial representation of a mounting bracket which permits removal of the vehicle mounted unit in accordance with the invention.

Data transfer from the VMU is accomplished by means of the serial communications interface 610, 611 and communications port 120. A communications protocol is implemented as part of the VMU control program for data integrity during transmission. The physical size of the VMU is such that it is easily transportable and a mounting bracket is provided to permit easy removal of the VMU from the vehicle so that it may be transported to the vicinity of the off-line computer for data transfer. FIG. 7 is a pictorial representation of the VMU and mounting bracket. The mounting bracket 701 is meant to be installed permanently in the vehicle and allows the VMU to be easily connected or disconnected by means of the connector 702. When so installed in the mounting bracket 701, the VMU can be secured using the retaining screw 703. The power failure detection means and memory backup means, described below, permit data retention during transporation of the unit.

Figure 8:
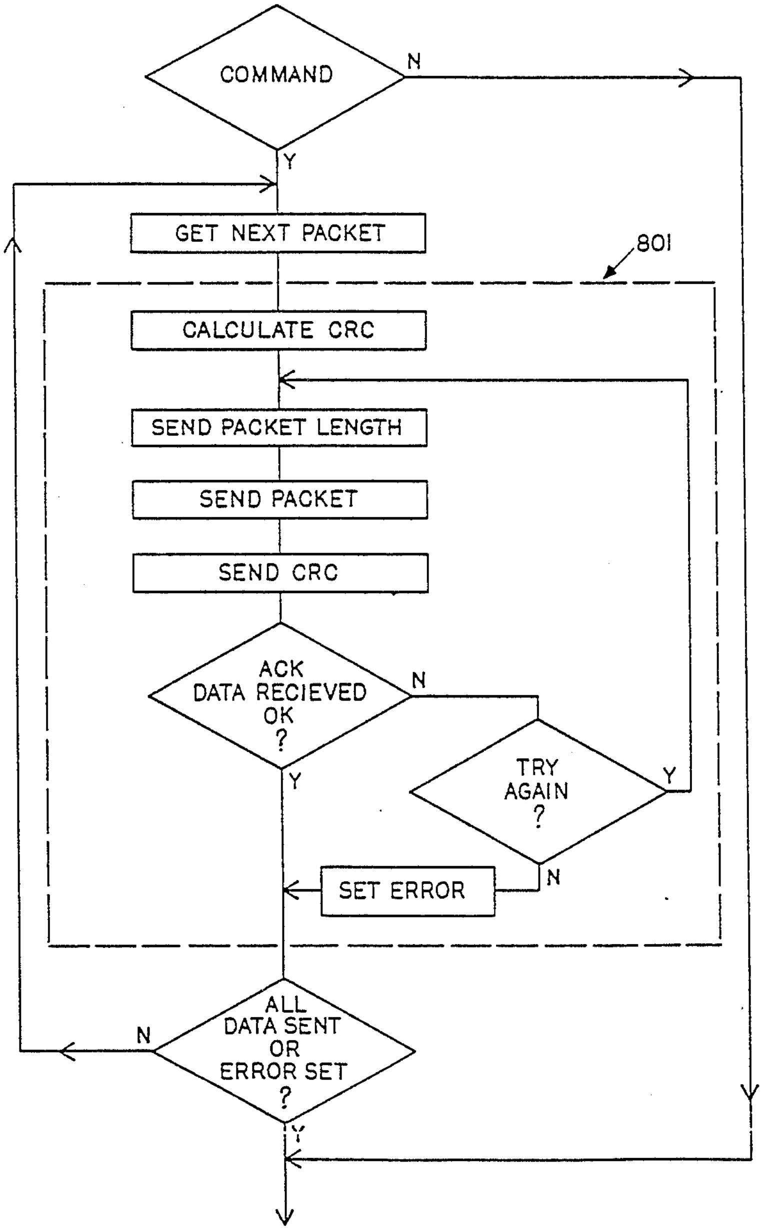
FIG. 8 shows a flowchart of the mechanism of data transfer in an embodiment of the invention.

The flowchart of FIG. 8 demonstrates the operation of the data transfer means. From the flowchart it can be seen that data transfer is initiated by the receipt of a command from the off-line computer, directing the VMU to transmit data. On receipt of this command the VMU starts transmitting the entire contents of data memory in fixed sized packets. The communication protocol is outlined by 801 and can be seen to operate as follows:

A cyclic redundancy check [CRC] calculation is performed on the data to be transmitted. The CRC is a function calculating the bytes of the data being transmitted. The result is the number known in the art as the CRC value, or just CRC.

The length of the packet, the packet itself and the calculated CRC are transmitted.

A wait state is then entered which is terminated when either a specified amount of time has elapsed (time out), an acknowledgement of receipt of the packet is received, or notification of an error condition is received.

In the case of a time out or notification of an error condition, the data are transmitted. In the case of an acknowledgement being received, the next packet is transmitted along with its length and CRC.

The packet size, the length of at time out, and the number of times the protocol will retransmit, are all programable values. Typical sizes for packet length, time out duration and number of retries are 128 bytes, 2 seconds, and 4 packet retransmissions respectively. The CRC is a function calculated on each byte of the transmitted data. When the data are received, the receiving protocol recalculates the CRC on the data, using exactly the same function. Comparing the transmitted CRC with the received CRC, allows errors in the received data to be detected.

In the preferred embodiment of the VMU, the front panel layout is as depicted in FIG. 2, which shows display units 202 and 203, push button switches 204, 205, 206 and 207, and status indicators 201. The display 202, 203, consists of 6 light emitting diode (LED) display units. Four pushbutton switches 204–207, are provided for selecting the desired display mode. The available modes are speed and rpm, average fuel consumption and time, and statistical information. The push button switches and display can also be used by the driver for data entry.

Data are entered as a 2-digit category and a 4-digit descriptor, permitting 99 possible category entries and, for each category, 9999 possible descriptor entries. Switch 207 is first pressed to select input mode. Switch 206 is then used to enter the 2-digit data category. The data descriptor is then entered, using push button switches 205 and 204, for entry of the lower 2 digits, anud the upper 2 digits, respectively. Holding either of switches 204, 205 or 206, closed, causes the digits displayed in display banks 202 and 203, to increment. The switches are then released when the desired value is displayed. The entered values are stored by momentarily pressing switch 207 once more, which also exits input mode.

Figure 9:
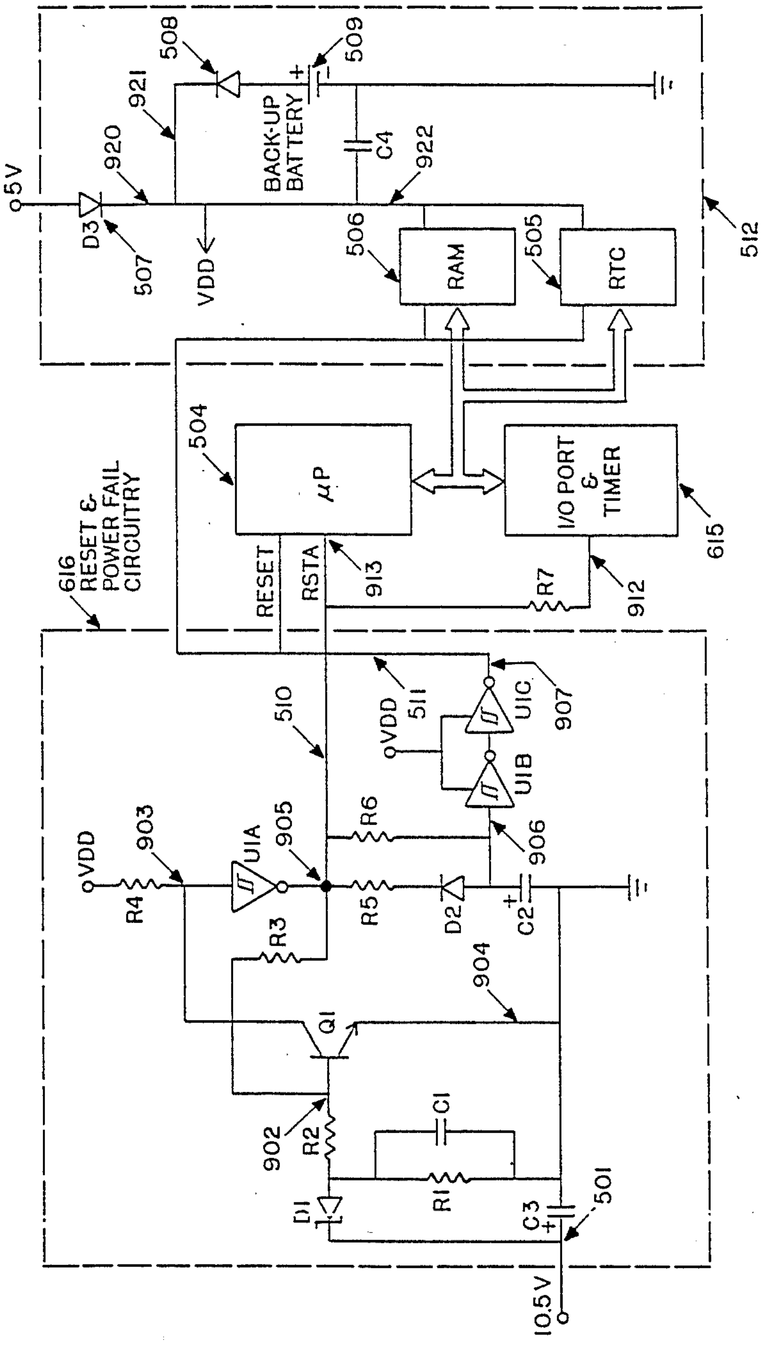
FIG. 9 is a detailed schematic diagram of the power fail detection circuit of FIG. 6.

FIG. 9 shows a circuit diagram of the power fail detection circuitry. Item 616 is the circuitry responsible for monitoring the power line to detect a power fail and item 512 shows the components necessary for data retention during a power fail. From the diagram it can be seen that a drop in operating voltage along line 501 will cause a low voltage on line 902, which will cut off the current flow between points 903 and 904, causing point 903 to rise to voltage VDD. This causes a zero voltage at point 905 which is transferred along lone 510 to input port 912 of I/O device 615, and input port 913 of microprocessor 504. When the zero voltage appears at point 905, capacitor C2 starts to discharge across R5. Some time later, the voltage at point 906 drops, and causes point 907 to decrease to zero volts, which is transferred along line 511 to microprocessor 504, RAM chip 506, and real-time clock chip 505. This halts the microprocessor and sets the RAM chip and the real-time clock chip in data retention mode.

The time constant of C2 and R5 is chosen to allow sufficient time for microprocessor 504, to execute a power fail interrupt routine, which is initiated the instant input port 913 goes low. When the operating voltage 920, for real-time clock chip 505, and RAM chip 506, drops below the voltage of the backup battery 509, power for these devices will be supplied by the battery 509.

On receiving the power fail interrupt at port 913, microprocessor 504, executes the power fail routine which proceeds to save all data currently being processed, along with the current time from the real-time clock chip 505, then enters a loop in which it continuously monitors input port 912. This loop is terminated when either input to port 912 goes high, or microprocessor 504, is halted by the reset line 511 going low. If the input at port 912 goes high before microprocessor 504 is halted, this signifies the termination of a short power failure, and microprocessor 504 then continues it regular operation. When normal operating voltage returns after microprocessor 504 has been halted, it checks a bit pattern in RAM 506, to determine whether it is restarting from a power failure, and saves the recovery time from real-time clock 505, before retrieving the saved data and continuing with its regular operation.

Figure 10:
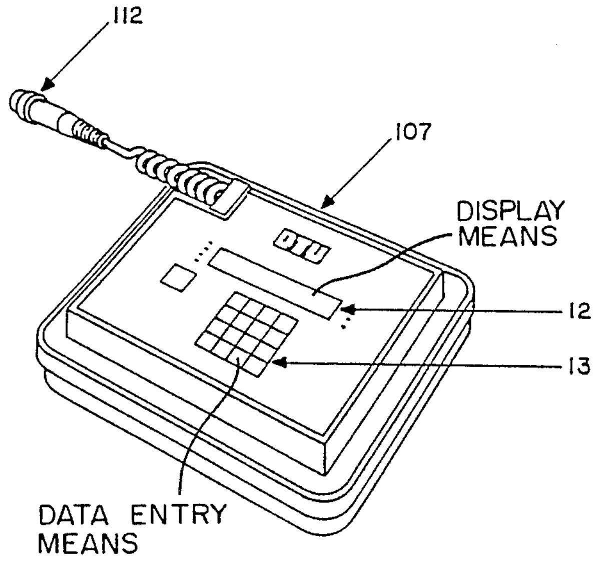
FIG. 10 is a pictorial representation of the optional Data Transport Unit.

FIG. 10 is a pictorial representation of the optional data transfer unit [DTU], item 107. As can be seen from FIG. 1, the DTU 107, provides an alternate method of transferring data from the VMU, 104, to the computer 111. The DTU 107, has sufficient data storage capacity to store data from up to 64 vehicles, 100, and its internal battery will maintain said data for a period of several months.

Referring again to FIG. 10, item 112 is the integral cable and connector which mates with VMU port shown as 120 in FIG. 1. The DTU is provided with display means 12, and data entry means 13. Using the data entry means 13, the DTU can be set to the following operational modes:

Display DTU operational status on display means 12.

Display/Edit VMU program control parameters.

Down-load data from VMU.

Up-load data to the off-line computer.

I claim:

1. A vehicle monitoring, recording and analyzing system comprising:

(a) a plurality of sensors located within said vehicle for the purpose of sensing operating parameters therefrom, said sensors generating data signals representing varying magnitudes corresponding to values of said operating parameters;

(b) a data processing and recording device located entirely on-board said vehicle and comprising:

(i) computing means, including a central processing unit (CPU) and a real time clock device, for periodically sampling each of said data signals in sequence and producing data samples representative of the magnitudes of said data signals from each of said sensors;

(ii) program memory storage means for storing an operating program for said CPU;

(iii) data memory storage means for receiving and storing said data samples;

(iv) program data memory storage means for storing program control parameters to control said operating program for said CPU;

(v) data compression means for implementing a data compression scheme operating in accordance with said operating program to store compressed data in a block of successively arranged memory locations in said data memory storage means and comprising:

(a) means for mathematically accumulating the said data samples from any one of said sensors for fixed time intervals for determining sums of the said data samples in each fixed time interval;

(b) means for storing consecutive sums in consecutive memory locations in said block of said data memory storage means;

(c) means for detecting occurrences of sums of zero in each of a predetermined number of consecutive fixed time intervals, said means for detecting said occurrences, upon detection of each occurrence, causing said means for storing to cease storing said consecutive sums and also forming summary blocks in said block in said data memory storage means;

(d) means for recording in each summary block the total length of time during which said consecutive sums remain zero;

(e) means for detecting reoccurrences of sums greater than zero, said means for detecting said reoccurrences causing said means for recording to cease recording said summary blocks, and said means for storing to resume storing said consecutive sums;

(vi) power supply means associated with said vehicle for operating said CPU, said program memory storage means, said real time clock device and said data memory storage means;

(vii) power supply means independent of said vehicle for operating said real time clock device and said data memory storage means in the absence of power from said power supply means associated with said vehicle;

(viii) data communication means operative to read said compressed data from said data memory storage means and to transfer said compressed data to external data processing equipment.

2. A system as defined in claim 1 and including means for maintaining data recorded in said data memory storage means when said data processing and recording device is disconnected from said vehicle;

whereby, said data recorded in said data memory storage means can be transferred to said external data processing equipment by disconnecting said data processing and recording device from said vehicle and connecting it to said external data processing equipment.

3. A system as defined in claim 1 and further including means for transferring data from said data memory storage means to said external data processing equipment, said means for transferring comprising an output port; said output port being connectable to any one of:

(a) directly to an input port of said external data processing equipment by bringing said data processing and recording device and said external data processing equipment physically together; or (b) to said input port of said external data processing equipment via cable means; or (c) to said input port of said external data processing equipment via a telephone modem; or (d) to an input of a portable data transfer unit, said portable data transfer unit having an output port connectable to said input port of said external data processing equipment.

4. A system as defined in claim 1 and further including:

said external data processing equipment including said program control parameters;

said data communicaton means being further operative to transfer said program control parameters from said external data processing equipment to said program data memory storage means.

5. A system as defined in claim 1 wherein said fixed time interval is programmably variable.

6. A system as defined in claim 1 and further including display means connected to said data memory storage means to dsiplay selected portions of values stored in said data memory storage means.

7. A system as defined in claim 1 wherein said data processing and recording device further includes;

(ix) high resolution data compression means for implementing a high resolution data compression scheme operating in accordance with a second operating program to store high resolution compressed data in a circular buffer in said data memory storage means, and comprising:

(a) second means for mathematically accumulating said data samples from any one of said sensors within second programmed fixed time intervals, said second programmed fixed time intervals being much smaller than said programmed fixed time intervals for determining second-sums of said data samples in each of said second fixed time intervals;

(b) third means for storing consecutive said second-sums in consecutive memory locations in said circular buffer of said data memory storage means;

(c) fourth means for detecting occurrences of said second-sums of zero value in each of a second predetermined number of consecutive second fixed time intervals, said fourth means for detecting said occurrences, upon detection of each occurrence, causing said third means for storing to cease storing said consecutive second-sums and also forming second summary blocks in said second block of said data memory storage means;

(d) fifth means for recording in each said second summary block the total length of time during which said consecutive second-sums remain zero; and (e) sixth means for detecting the reoccurrences of said second-sums of value greater than zero, said sixth means for detecting said reoccurrences causing said third means for storing to resume storing said consecutive second-sums.

8. A system as defined in any one of claims 1 or 7 and further including power failure detection means to ensure proper shutdown in the event of a power failure or removal of the system from the vehicle, and further storing in said data memory storage means information as to the time and duration of said power failure or removal.

* * * * *